June 27, 1939.  A. ZUCKERMANN, CALLED A. ZOUCKERMANN ET AL  2,164,046
MACHINE TO PUNCH ELECTRIC SIGN TAPE OR THE LIKE
Filed May 24, 1938   8 Sheets-Sheet 5
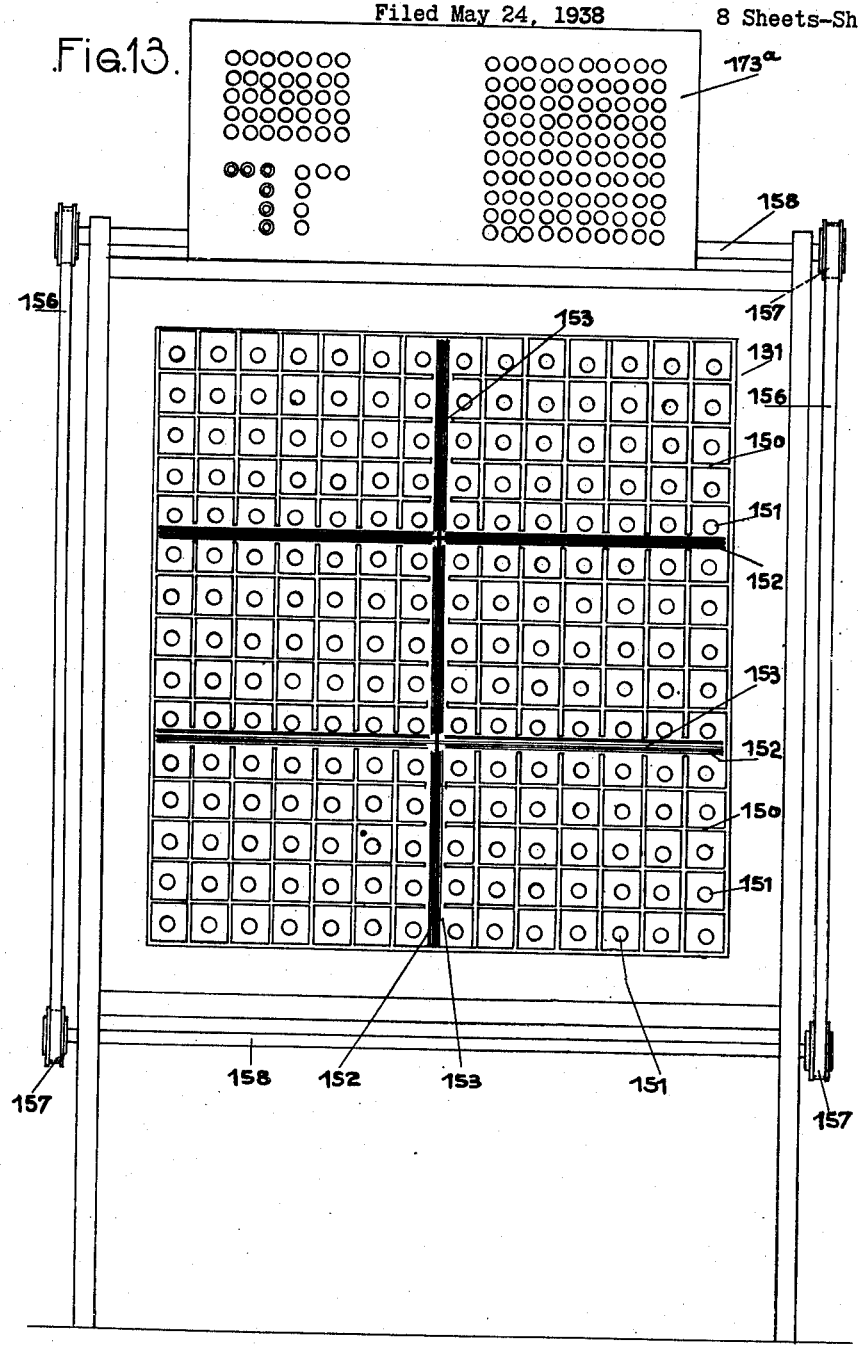
INVENTORS:
ARMAND ZUCKERMANN AND
ADOLPHE JULIEN EMILE RENARD
BY Haseltine, Lake & Co.
ATTORNEYS

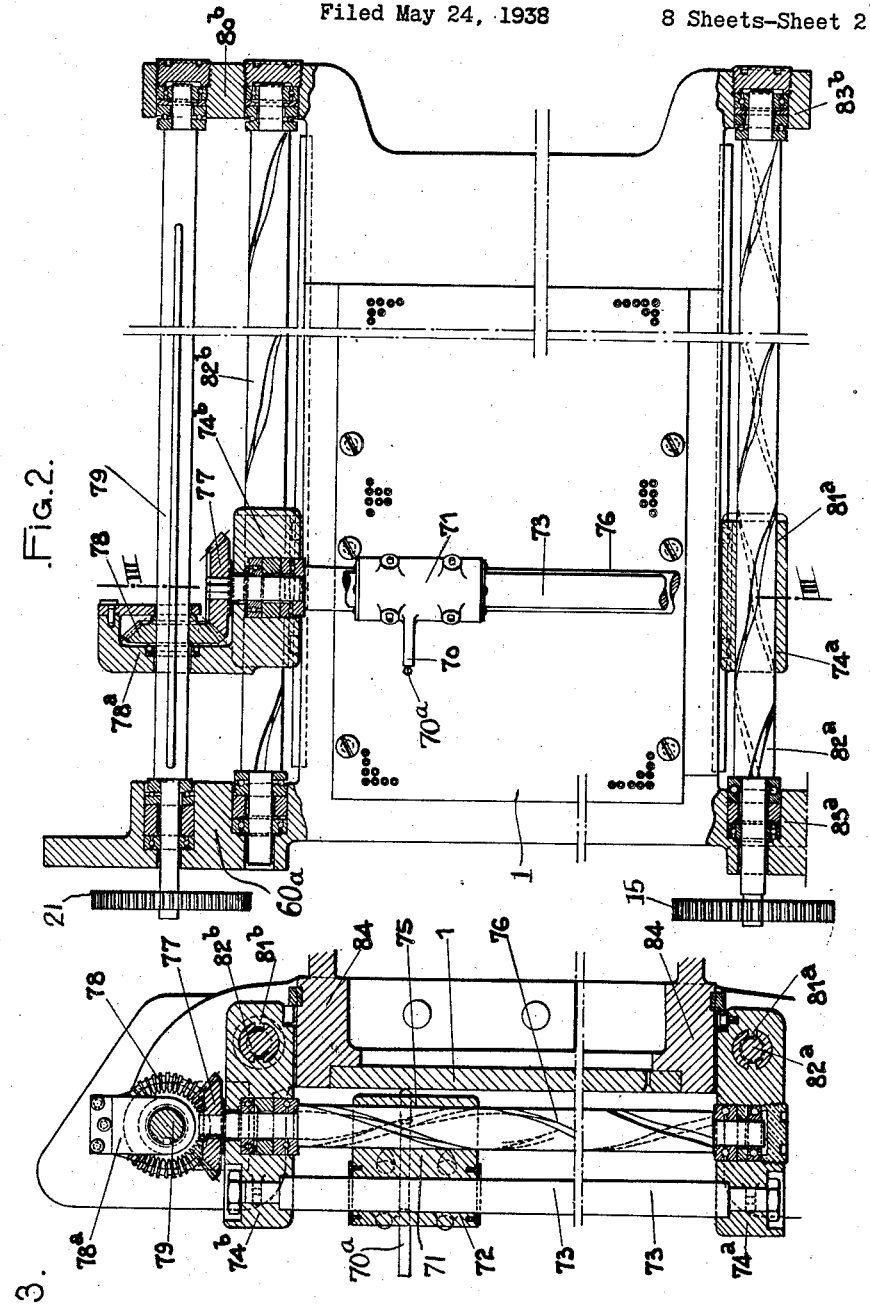

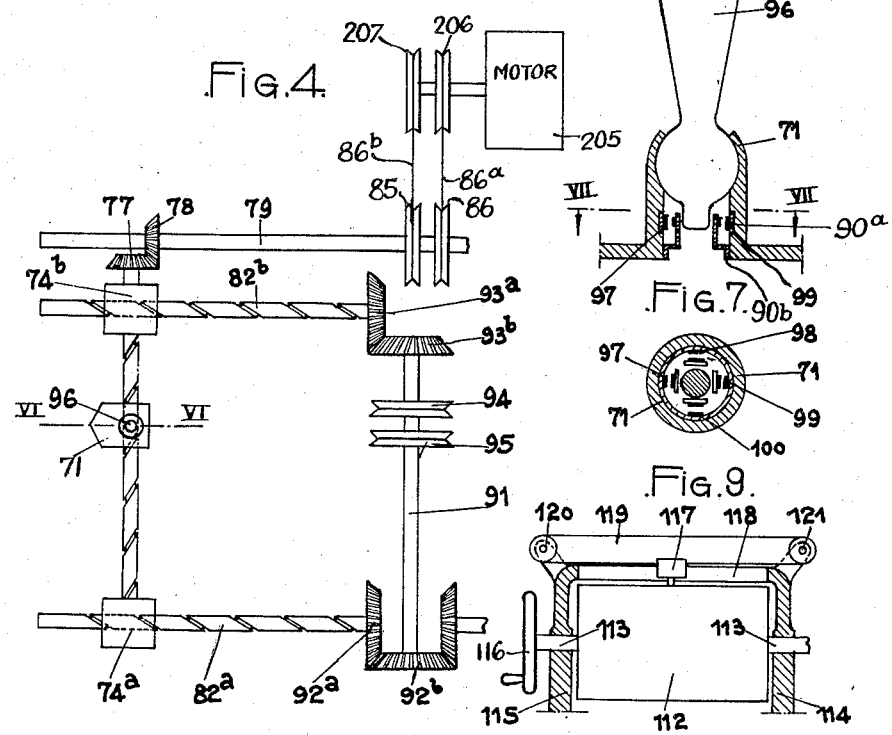

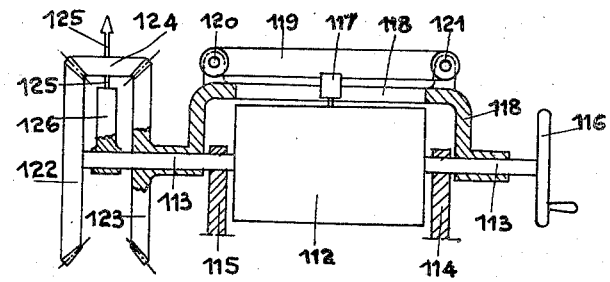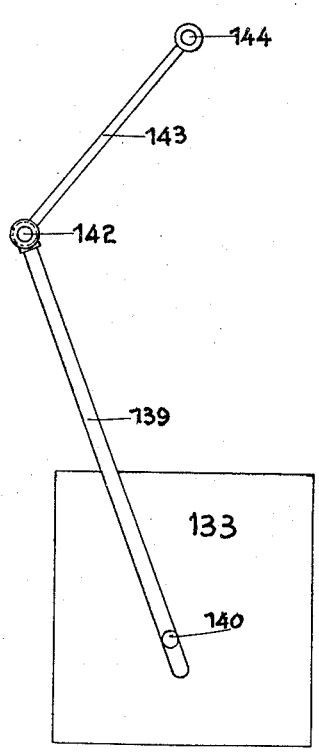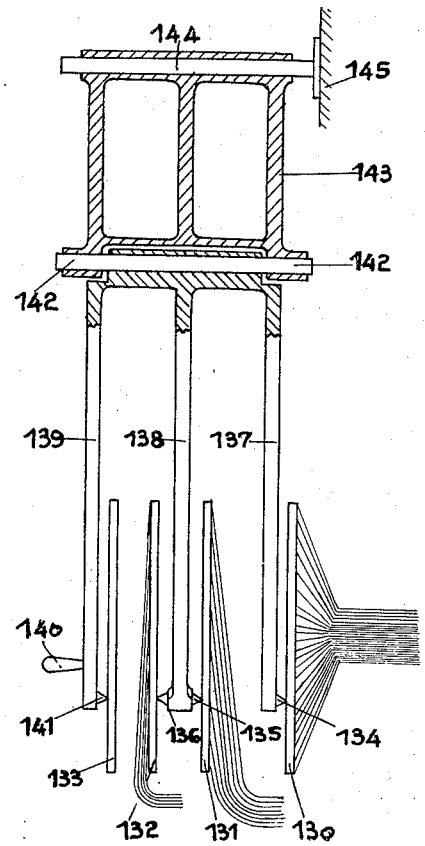

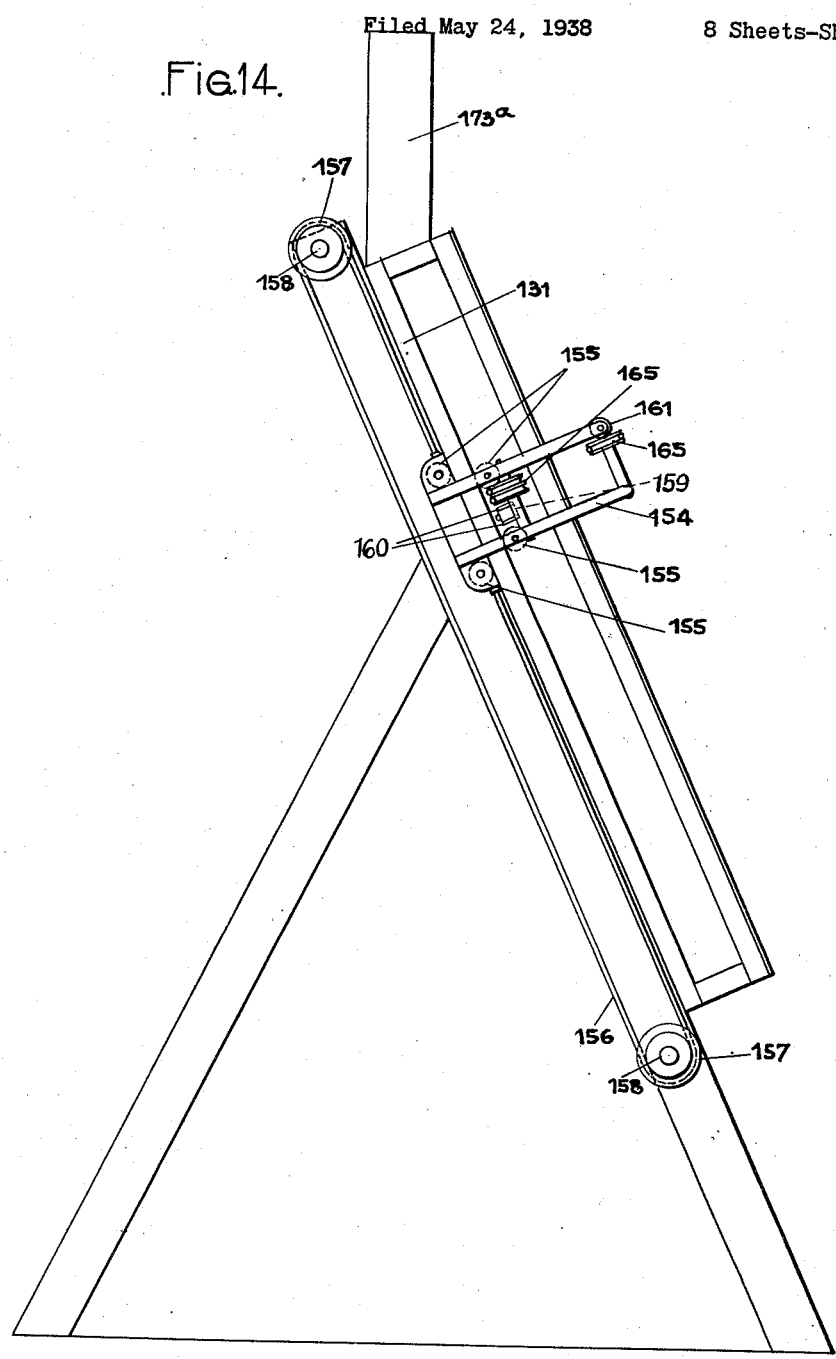

June 27, 1939.
A. ZUCKERMANN, CALLED A. ZOUCKERMANN ET AL
2,164,046
MACHINE TO PUNCH ELECTRIC SIGN TAPE OR THE LIKE
Filed May 24, 1938     8 Sheets-Sheet 7
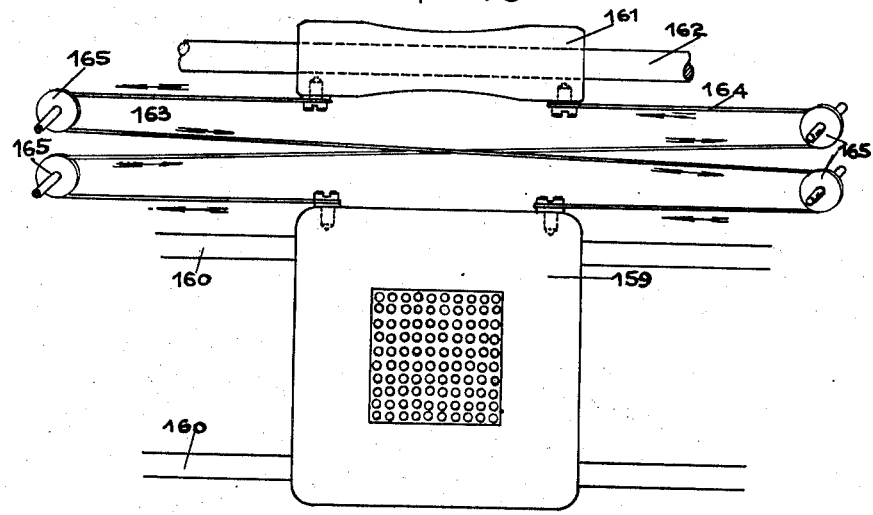
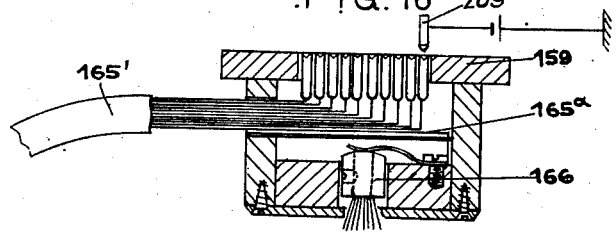
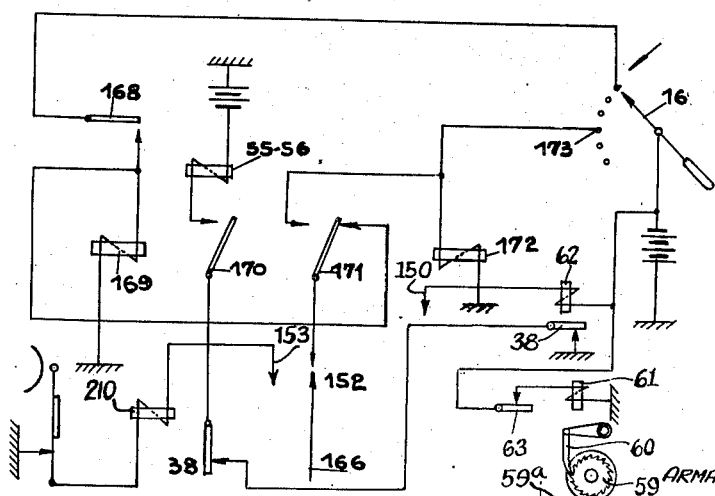
INVENTORS.
ARMAND ZUCKERMANN.
AND,
ADOLPHE JULIEN EMILE RENARD.
BY Haseltine, Lake & Co. ATTORNEYS June 27, 1939.  A. ZUCKERMANN, CALLED A. ZOUCKERMANN ET AL  2,164,046
MACHINE TO PUNCH ELECTRIC SIGN TAPE OR THE LIKE
Filed May 24, 1938    8 Sheets-Sheet 8
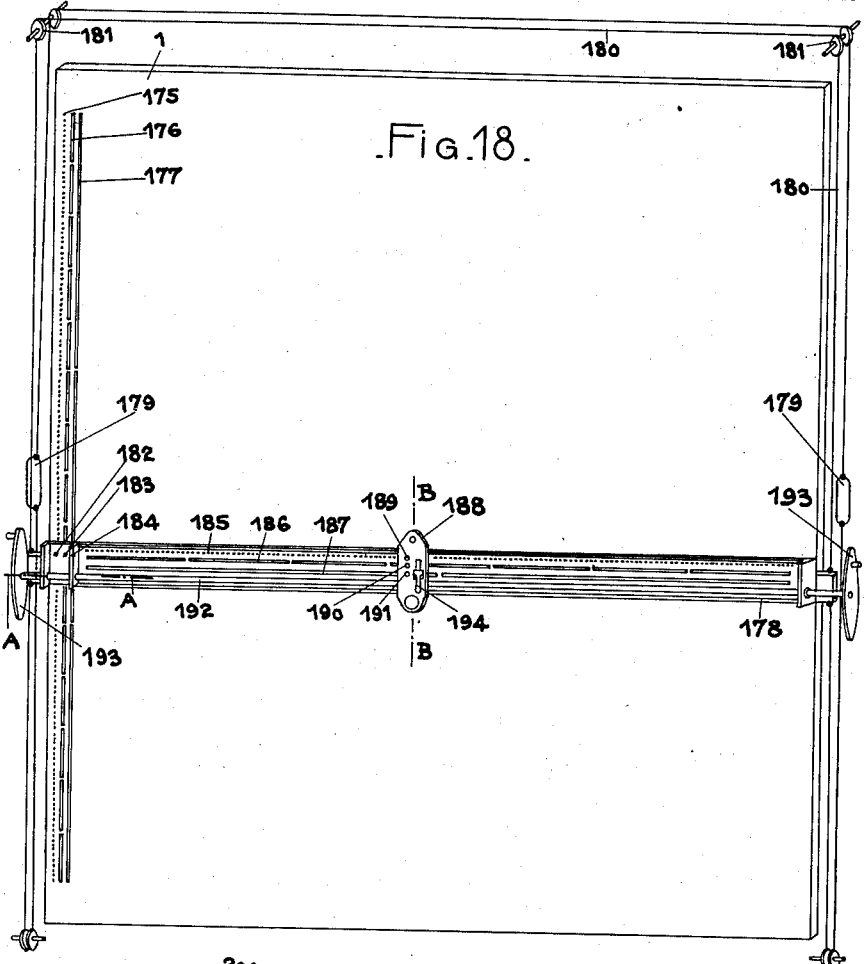
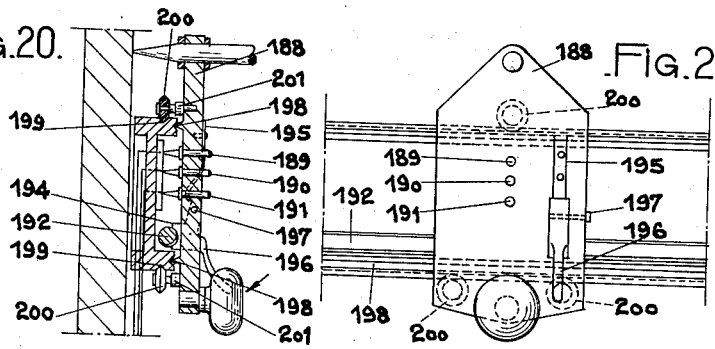
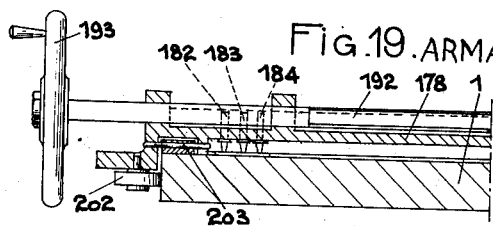
INVENTORS:
ARMAND ZUCKERMANN
AND
ADOLPHE JULIEN
EMILE RENARD
BY Haseltine Lake & Co.
ATTORNEYS Patented June 27, 1939

2,164,046

UNITED STATES PATENT OFFICE 2,164,046

MACHINE TO PUNCH ELECTRIC SIGN TAPE OR THE LIKE

Armand Zuckermann, called Armand Zouckermann, Paris, and Adolphe Julien Emile Renard, Saint-Denis, France, assignors to Société à Responsabilité Limitée: Luminograph, Paris, France Application May 24, 1938, Serial No. 209,746
In France May 25, 1937

4 Claims. (Cl. 164—115)

There exist numerous apparatus composed of a multiplicity of juxtaposed receiving devices, the operation of which is controlled by one or a plurality of control bands which are for example perforated, provided with projections or with depressions, or printed. Amongst such apparatus, some only have a restricted number of receiving devices; such is the case for example of pneumatic pianos. Others on the contrary are composed of a very large number of receiving devices, as is the case for example in publicity panels which are formed by juxtaposed elements that are independently capable of changing their aspect, such as lamps or movable shutters. The considerable number of said elements, which often attains several tens of thousands, no longer enables the use to be made of a series of marks, such as perforations, for example, for controlling each element separately, since this would lead, amongst other difficulties, to widths of control bands, or to a number of control bands, which would be beyond the realm of possibilities of industrial construction. This has therefore led to distributing said elements in zones and to effecting two selections simultaneously for controlling the operation of an element: viz. the selection of the zone to which said element belongs, and the selection of the element in said zone. It is well known that if the number of elements in a zone is represented by $m$, and the number of zones by $n$, the number of the series of marks (which for the clearness of the explanation will hereinafter be called perforations, although such marks may be other than perforations) is in this case reduced to $(m+n)$, the number of elements of course being $(mn)$. The decrease in the number of series of perforations may be carried still further and the zones grouped into sectors; if there are $p$ sectors, the number of series of perforations is $(m+n+p)$ for a number of elements equal to $(mnp)$.

It will then be understood that each element is characterized by a plurality of perforations, the number of such perforations corresponding to the number of selections necessary, which may be any number. If for example the elements are grouped in zones, two selections are necessary and each element is characterized by two perforations; if the zones in their turn are distributed into sectors, it will be necessary to effect three selections, and each element will be characterized by three perforations.

The object of the invention is to solve the technical problem which consists in constructing a machine capable of automatically producing on the band the perforations that are necessary for characterizing an element, as soon as the operator has chosen said element.

With this object in view, the invention consists in the combination of the following means:
1. A device (board, cylinder, keyboard or the like) which materializes for the operator the whole of the elements which will be controlled by the band to be perforated, on which device the operator successively chooses the elements in the order that suits him;
2. A translating device, which is associated with the former and the effect of which is to determine automatically the characteristics of the element chosen (number of the element in its zone, number of said zone in the sector, number of said sector in the panel, etc.);
3. Selecting devices controlled by said translator;
4. And finally marking devices such as perforators, associated with each selecting device and controlled by the latter.

The invention includes several other detail features which will be explained hereinafter; it appears, in fact, to be preferable to describe forthwith, by way of example and with reference to the accompanying drawings, certain embodiments of the invention in order to enable same to be more readily understood.

In said drawings:

Fig. 2 is an elevation, in partial section, of a modification of the translating mechanism.

Fig. 3 is a section along the line III—III of Fig. 2.

Fig. 4 is a diagram of another modified embodiment of the translating mechanism.

Fig. 5 shows diagrammatically one of the tensioning devices used in the embodiment of the mechanism shown in Fig. 4.

Fig. 6 is a section along the line VI—VI of Fig. 4 showing a diagrammatical embodiment of an operating handle for the cursor of the translating mechanism of Fig. 4.

Fig. 7 is a section along the line VII—VII of Fig. 6.

Fig. 8 shows an elevational view of an exemplary embodiment of a perforator element.

Fig. 9 shows another embodiment of a translating mechanism.

Fig. 10 shows a modified embodiment of a translating mechanism.

Fig. 11 shows an embodiment of a device for selecting by panels.

Fig. 12 is a side elevation in part section corresponding to Fig. 11.

Figure 1:
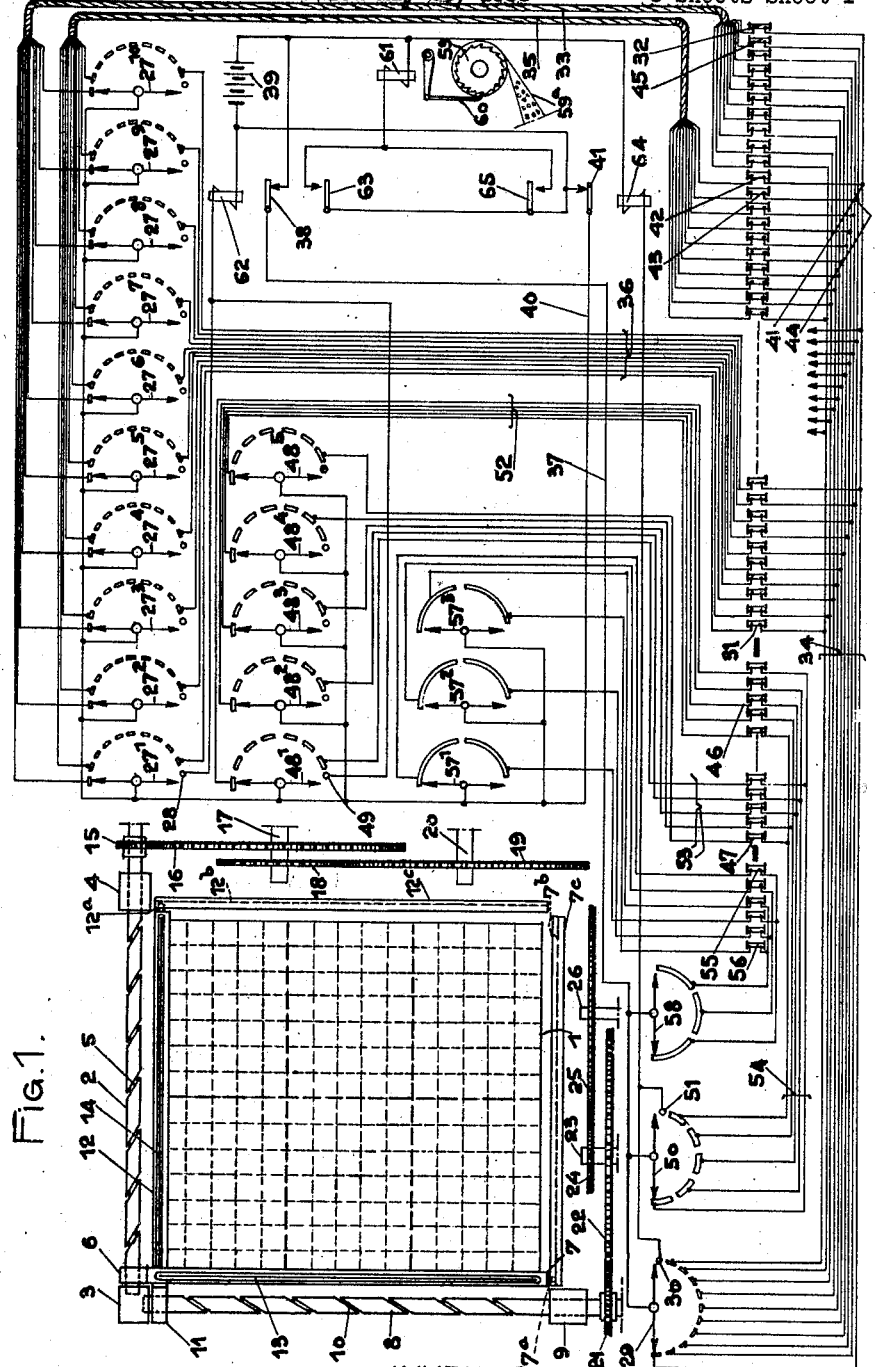
Fig. 1 is a diagram of the machine according to the invention.

Figs. 13 to 17 relate to an improvement of Figs. 1 to 5 and wherein:

Fig. 13 is an elevational view.

Fig. 14 is a side elevation.

Fig. 15 is a detail view on a larger scale.

Fig. 16 is a sectional plan view corresponding to Fig. 15.

Fig. 17 is a diagram of connections.

Figs. 18 to 21 relate to another embodiment, and wherein:

Fig. 18 is an elevational view.

Fig. 19 is a sectional view on a larger scale, along the line A—A of Fig. 18.

Fig. 20 is a sectional view, on a larger scale, along the line B—B of Fig. 18.

Fig. 21 is a front view corresponding to Fig. 20.

In the example shown in Figs. 1 to 5, the device, which materializes for an operator the whole of the elements that will be controlled by the band to be perforated, is formed by a board 1, since this example relates more particularly to the preparation of a perforated band for controlling the elements of a publicity panel which reproduces the board 1, of course on a very much larger scale. The operator has to draw on the board 1 the picture which will appear on the publicity panel, and this sole operation is adapted to lead to the production of the suitable perforation on the band.

In the example chosen, the elements forming the publicity panel, which elements are formed for example by electric lamps, are distributed in square zones of 100 elements each. There are therefore in each zone 10 elements which are counted in the vertical direction or in the horizontal direction. The zones of 100 elements are grouped in rectangular sectors each comprising 7 vertical rows of 5 zones (or in other words 5 horizontal rows of 7 zones). Finally, the sectors are grouped in 2 horizontal rows of 3 sectors (or in other words 3 horizontal rows of 2 sectors). There therefore exist 6 sectors and 35 zones of 100 elements each per sector, which gives a total of 21,000 elements to be controlled.

If each element had to be controlled directly by a series of perforations of its own, it would require a perforated band capable of containing in its width 21,000 perforations. Even if said perforations were arranged in an oblique line and not in a line perpendicular to the lateral edges of the band, this would obviously lead to a width of band which is incompatible with practical possibilities. But the distribution of the elements in zones and in sectors permits of a return to practicable dimensions, since it suffices to have 6 perforations for controlling the 6 sectors of the panel, 36 perforations for controlling the 35 zones of a sector, and 100 perforations for controlling the 100 elements of a zone. The number of series of perforations that are necessary can thus be limited to 141 instead of 21,000.

It is quite obvious that the foregoing figures are given in a purely indicative manner, in order to enable the invention to be better understood by the description of a concrete case, but that the invention includes all the particular cases which have other figures than the foregoing.

It has, of course, not been possible to show the 21,000 elements on the board 1, the scale of the drawing being much too small; but the 210 zones have been shown in dotted lines, and the 6 sectors have been shown in thicker chain dotted lines. It will be understood moreover, from the ensuing description, that it is in no way necessary to show said elements, zones and sectors on the board 1; it suffices for the board 1 to be similar, with a predetermined factor of similitude, to the publicity panel.

The translating mechanism is constructed as follows in this example; parallel with one of the horizontal edges of the board 1 is arranged a threaded shaft 2 which is supported by bearings 3 and 4. The thread of said shaft, which is shown at 5, is of sufficiently coarse pitch for the screw to be reversible, that is to say readily rotated by a thrust exerted on a nut 6 mounted on the threaded shaft 5, said nut not rotating. A rule 7 is secured to said nut 6 and can move horizontally on the plane of the board 1; the end 7$^a$ of said rule is guided in a slot 7$^b$ formed in a guiding bar 7$^c$ parallel to the threaded shaft 5. In the same manner, parallel with one of the vertical edges of the board 1 is arranged a threaded shaft 8 supported by bearings 3 and 9. The thread of said shaft, which is shown at 10, is also rather coarse so as to ensure reversibility. A nut 11 is mounted on the threaded shaft 8, and a rule 12, which is vertically displaceable on the plane of the board 1, is secured to said nut 11. The end 12$^a$ of the rule 12 is guided in a slot 12$^b$ formed in a guiding bar 12$^c$ parallel to the threaded shaft 8. The two rules 7 and 12 each carry a slot 13 and 14 respectively.

The pencil of the operator is placed at the intersection of the slots 13 and 14 and it will be seen that any movement of said pencil for drawing the desired drawing, involves both a horizontal displacement of the rule 7 and a vertical displacement of the rule 12. The nuts 6 and 11, which move with said rules, thus cause the shafts 2 and 8 to rotate, and these rotations measure the Cartesian co-ordinates of the point where the operator's pencil is located at each instant.

In the example chosen wherein each zone comprises 10 (vertical or horizontal) rows of 10 equally spaced elements, the same pitch has been chosen for the threads of the shafts 2 and 8. But it will be understood that if the spacing of the elements were not the same between the elements of the horizontal rows and the elements of the vertical rows, the pitches of the two threads would not be identical. The unit of measurement, in the vertical direction and in the horizontal direction, is the spacing between two successive elements; but said spacing is obviously not necessarily the same in both cases.

The shaft 2 rotates through an angle $a$ when the operator's pencil travels through the width of a zone; the pitch of the thread 5 is so chosen that said angle $a$ corresponds to $2\pi$ or to a whole fraction of $2\pi$. In the example illustrated, $a=\pi$, but any other value could obviously have been adopted. For the reasons already mentioned, the same arrangement has been adopted for the shaft 8.

The shaft 2 is provided at 15 with a pinion which meshes with a wheel 16 fast on the shaft 17, and the gear-down ratio is $\frac{1}{7}$ so that when the operator's pencil has travelled horizontally through 7 zones, and the shaft 2 has rotated $7\pi$, the shaft 17 has rotated through an angle $\pi$. The reason for this arrangement is that, in the example chosen, there exist 7 zones in each horizontal row of zones of a sector; and just as it was desired that the shaft 2 should rotate $\pi$ when the pencil travels through a horizontal row of elements in a zone, so it is desired that the shaft 17 should rotate $\pi$ when the pencil travels through a horizontal row of zones in a sector. Since each horizontal row of sectors in the panel comprises 2 sectors, the shaft 17 is provided with a wheel 18 meshing with a wheel 19 of double the radius fast on the shaft 20, so that said shaft 20 rotates $\pi$ when the pencil travels through a horizontal row of sectors.

Such arrangements are not indispensable; if $a$ is the angle of rotation of the shaft 2 when the pencil travels through a horizontal row of elements in a zone ($a$ equal to or less than $2\pi$), it rotates through an angle equal to ($7a$) when the pencil travels through a horizontal row of zones in the sector; it suffices for the gear-down ratio $r$ between the shafts 2 and 17 to be such that:

$$7ar = \pi \text{ or a whole fraction of } \pi$$

Similarly, if R is the gear-down ratio between the shafts 17 and 20 it suffices that:

$$7arR = \pi \text{ or a whole fraction of } \pi$$

since said shaft 20 must not rotate through a greater angle than $2\pi$ during the travel through a horizontal row of sectors.

Similarly, the shaft 8 receives a pinion 21 which meshes with a wheel 22, the radius of which is 5 times larger (since the vertical rows of zones comprise 5 zones per sector). The wheel 22 is fast on a shaft 23 which receives a wheel 24 meshing with a wheel 25, the radius of which is 3 times larger (since the vertical rows of sectors comprise 3 sectors). The wheel 25 is fast on a shaft 26.

The selecting devices are formed as follows:

The shaft 2, in this diagrammatical example, carries 10 double contacts arms, numbered from $27^1$ to $27^{10}$ and each of same moves in front of a semicircular annulus of contacts. Each of said annuli has 10 contacts called: elemental contacts, which extend through almost the entire angle $\pi$. However, a small final angle is left empty to receive, in any one of said annuli, a special contact 28 the function of which will be explained hereinafter. It is obvious that the position of the contact arm $27^1$ in its annulus of contacts gives an element of the position of the operator's pencil in a zone; in fact, the contact arm travels through an angle $\pi$ as it passes horizontally across a zone. The angle formed by the contact arm $27^1$ with its original position therefore gives the abscissa, in a zone, of the position of the pencil.

The ordinate is given by a contact arm 29 fast on the shaft 8, and moving over an annulus of 10 element contacts likewise leaving a small final angle empty where a special contact 30 is lodged. The combined indications of the contact arms 27 and 28 therefore give the co-ordinates of the position of the pencil inside a zone.

With the assistance of these indications, it is an easy matter to energize, amongst 100 electromagnets representing the 100 perforating devices that are necessary for effecting the perforations of said elements, the electromagnet which corresponds to the co-ordinates thus determined by the translating device. For this purpose, the element electromagnets, which are located on the same straight line, as shown at 31, 43, etc., are grouped in tens; there are therefore 10 groups of 10. In the first group, each electromagnet is respectively connected by the wires 33 to the first contacts of the annuli co-operating with the contact arms 27; on the other hand, each electromagnet of this group is connected, according to its number in the group, to the contact of the same number of the annulus co-operating with the contact arm 29; this connection is ensured by the wires 34. Similarly, in the second group, each electromagnet is respectively connected by the wires 35 to the second contacts of the annuli co-operating with the contact arms 27; on the other hand, each electromagnet of said second group is connected according to its number in the group, to the contact of the same number of the annulus co-operating with the contact arm 29; this connection is ensured by a suitable multiplication of the wires 34. The same is done for all the groups, which have not all been shown for the sake of simplicity, the drawings showing only the first, the second and the last, the electromagnets of which are connected to the last element contacts of the annuli co-operating with the contact arms 27 by means of the wires 36.

The contact arm 29 is connected by the wire 37 and the dead contact 38 to one of the poles of a source of electric current 39. All the contact arms 27 are connected by the wire 40 and the dead contact of 41 to the other pole of the battery 39. It is obvious that the orientation of the contact arm 29 in its annulus of contacts and of the contact arms 27 in their annuli of contacts determine the energization of a very definite electromagnet of the series 31 etc. of element electromagnets by means of a circuit which is obvious to any person skilled in the art.

It might seem, at first sight, that it would have been possible not to use 10 contact arms and that a single one would have sufficed, by connecting each contact of the annulus of said single contact arm to all the electromagnets of the group corresponding to said contact. But, it is not possible to adopt this arrangement as will be readily understood from the following remark: it will be assumed that all the wires 33 are connected to the first contact of the annulus of the contact arm $27^1$, all the wires 35 to the second contact of said annulus, and so forth. The contact arms 29 and $27^1$ being in the position illustrated, it appears as if the current will only pass through the electromagnet 32. Now, it can be seen that this element would be shunted by the following circuit: connecting point 41—electromagnet 42—wires 35 all connected together—electromagnet 43—connecting point 44—electromagnet 45—wires 33 all connected together. Similarly a multiplicity of other shunts would be seen, whereby the 100 electromagnets would all be energized simultaneously and there would be no selection. The arrangement of the two contact arms 27 and of the 10 corresponding annuli is therefore absolutely necessary, and the application of said arrangement to the machine described is considered as an important feature.

The selection of the zone electromagnets, which are shown partially from 46 to 47, is effected in the same manner. The shaft 17 receives five contact arms $48^1$ to $48^5$ which are displaceable in front of semi-circular annuli comprising 7 zone contacts and a small dead space which serves for placing, on one annulus only (for example the first), a special contact 49 the function of which will be explained hereinafter. The shaft 23 receives a contact arm 50 which moves on a semi-circular annulus of 5 contacts, with a special contact 51. The zone electromagnets 46 to 47 are distributed in 7 groups of 5. In each group, each electromagnet is connected, on the one hand to the contact corresponding to the number of the group in each annulus of contacts of the contact arms 48, for example by the wires 52 for the first group and by the wires 53 for the last group, which are the only ones shown. On the other hand, in each group, each electromagnet is connected to the contact corresponding to the number of the electromagnet in the annulus of the contact arm 50, by the wires 54 which are suitably grouped. The operation is identical and therefore need not be repeated.

For the sectors, the 6 electromagnets 55 to 56 are identically selected. The shaft 20 carries 3 contact arms $57^1$—$57^2$—$57^3$ which move in front of semi-circular annuli of two contacts; the shaft 26 carries a contact arm 58 which moves on a circular annulus of 3 contacts. The electromagnets 55 to 56 are distributed in 2 groups of 3. In each group, each electromagnet is connected to the contact corresponding to the number of the group in the annuli of the contact arms 57, and to the contact corresponding to the number of the electromagnet in the annulus of the contact arm 58.

The feed mechanism of the perforated band $59^a$ is shown diagrammatically by the ratchet 59 which is actuated step by step in the well known manner, by the electromagnet 61. In the example chosen, the band has been required to be fed one step every time a zone is crossed, that is to say that the electromagnet has to be energized each time the operator's pencil passes from one zone to the other, vertically or horizontally. This is the purpose of the contacts 28 and 30.

In the horizontal direction, for example, the crossing of a zone is effected when the contact arm $27^1$ has travelled through an angle $\pi$. At this instant, it touches the contact 28, and the following circuit is closed: battery 39—dead contact 41—wire 40—contact arm $27^1$—contact 28—relay 62—battery 39. The relay 62 is energized.

At the contact 38, it opens the circuit of all the element, zone and sector electromagnets that are still likely to be energized. It is therefore certain that in any case said electromagnets will be de-energized. Then, at the contact 63, it closes a circuit for the electromagnet 61 which is energized and feeds the wheel 59 one step. As soon as the contact arm $27^1$ leaves the contact 28, the relay 62 falls and thereby de-energizes the electromagnet 61.

If the crossing of a zone is effected in the vertical direction, the contact arm 29 touches the contact 30 and energizes the relay 64. The latter breaks at 41 the supply of all the element, zone and sector electromagnets, then energizes at 65 the electromagnet 61 in the same manner as above.

The contacts 49 and 51 of the zone selectors need not exist, since it is not possible to change sectors without changing zones; however, their use forms a safety precaution. Said contacts are simply grouped on the contacts 28 and 30 respectively.

It is obvious that the mechanism of contact arms sliding on contacts, may, without difficulty, be replaced by a system of cams, which are substituted for the contact arms and which act by means of push rods on spring contacts which are substituted for the fixed contacts of the annuli. The two systems are absolutely equivalent, the first only having been adopted herein for the convenience of graphical illustration.

In order to decrease the friction and consequently facilitate the operation of the cursor or the like controlling the rotation of the shafts 2 and 8, only a single semi-circular annulus of contacts could be provided on the shafts 2, 17 and 20, said contacts controlling the circuits of electromagnets the armatures of which would in turn control the circuits 33, 35, 36, 52, 53.

The diagrammatical translating device which has been shown in Fig. 1 may have a large number of different embodiments, certain of which will be described hereinafter by way of example only, it being of course understood that they could be replaced by others without exceeding the scope of the unitary combination formed by the main object of the invention. However, it is specified that said embodiments are detail objects of the invention and consequently form a part of said invention.

In the embodiment of Figs. 2 and 3, the mechanism is provided, as in Fig. 1, with a board 1 showing or materializing the publicity panel. A stylus $70^a$ secured to the ear 70 of the part 71 enables an operator to follow a drawing effected on the board 1. The part or cursor 71 is bored at 72 for adapting on a rod 73 which is fixed to the slides $74^a$ and $74^b$ and on which, consequently, the cursor 71 can slide. On the other hand, said cursor 71 is internally threaded at 75 to fit on a threaded shaft 76, which corresponds to the shaft 8 of Fig. 1, the cursor 71 corresponding to the nut 11. It will be understood that the movements of the cursor 71 along the guide rod 73 will produce a rotation of the threaded shaft 76 the ends of which are journalled respectively in the slides $74^a$ and $74^b$. On the upper end of the threaded shaft is fixed a bevel pinion 77 which meshes with a bevel pinion 78 which is journalled in a cage $78^a$ of the slide $74^b$ and which is angularly secured to a shaft 79 on which it can slide. The shaft 79 is journalled in bearings $80^a$ and $80^b$ provided in the upper ends of the frame 84 supporting the board 1.

The slides $74^a$ and $74^b$ are internally threaded at $81^a$ and $81^b$ for mounting on identical threaded shafts $82^a$ and $82^b$ similar to the shaft 2 of Fig. 1. Said threaded shafts $82^a$ and $82^b$ are respectively journalled in bearings $80^a$—$80^b$ and $83^a$—$83^b$ provided at the upper and lower ends of the frame 84 of the board 1. It will therefore be understood that the lateral movements towards the left or towards the right of the slides $74^a$ and $74^b$ and consequently of the rod 73 and of the shaft 76 on which is mounted the cursor 71 will cause the shafts $82^a$ and $82^b$ to rotate in one direction or the other.

One of the ends of the shaft 79 is fast the wheel 21 actuating one of the two selecting devices, as in the diagram of Fig. 1. Similarly, one of the ends of one of the shafts $82^a$ and $82^b$ carries the wheel 13 actuating the other selecting device as in the diagram of Fig. 1.

In this manner, when the cursor 71 is displaced on the board 1, it will be seen that these displacements will be transmitted to the two selecting devices in a similar manner to that described with reference to Fig. 1.

Instead of acting directly on the cursor 71 to move same, it would be possible to act on the threaded shafts by means of hand-wheels or the like, the cursor 71 being in that case moved by the rotation imparted to said shafts.

It will be understood that, owing to the friction of the various movable members, the movement of the cursor 71 requires a relatively considerable force. In order to overcome this drawback and as shown in Figs. 4, 5 and 6, a device may be provided which acts as a servo-motor for driving the shafts actuating the selecting devices. In this embodiment, on the shaft 79 are arranged two pulleys 85 and 86 which are adapted to be driven by a suitable motor 205 through the intermediary of belts, one 86a being straight and the other 86b crossed. Said belts pass over pulleys 206—207 and 85—86, and normally have sufficient slack for there not to be a drive of the pulleys 85 and 86. Furthermore, on each of the belts is provided a stretching device such that when it is made operative, the corresponding pulley is driven by the motor.

Said stretching device is formed, for example, as shown in Fig. 5, by a roller 87 over which the belt passes and which is journalled on a spindle 88 provided at the forked end of the core 89 of an electromagnet 90 in such a manner that when said electromagnet is energized, the roller 87 moves and stretches the belts, thereby producing the drive of the pulley 85 or 86 by the shaft of the motor the electromagnet 90 is connected by the wires 90a and 90b to the switch actuated by the handle 96.

In a similar manner, the shafts 82a and 82b, on which are mounted the slides 74a and 74b, are angularly connected together by a shaft 91 and two groups of bevel pinions 92a—92b and 93a—93b, the selecting device being in that case actuated by the shaft 91 for example. On said shaft 91 are also fixed two pulleys 94 and 95 which are adapted to be driven by a suitable motor, not shown, through the intermediary of belts, one of which is straight and the other crossed in an identical manner to that indicated above for the shaft 79.

The various electromagnets actuating the stretching devices for the belts have their energizing circuits controlled by a suitable switch such that the stretcher or stretchers which are thus made operative are those which cause the shaft or shafts to be driven controlling the selecting devices in the direction corresponding to that imparted to said shaft or shafts by the movement of the cursor 71. In an advantageous embodiment shown diagrammatically in Figs. 6 and 7, said switch is controlled by the operating handle 96 provided on the cursor 71. For this purpose, said handle 96 is swivel mounted on the cursor 71 and has an extension which controls the closing of four switches 97—98—99 and 100 arranged along two perpendicular directions respectively parallel with the shafts 76 and 82a—82b.

Said switches respectively control the stretchers of the belts which tend to rotate said shafts in the direction in which the cursor 71 itself tends to rotate them when it is displaced by means of the handle 96, since it will be observed that said handle 96 is inclined in the same direction as that in which the cursor 71 is moved.

Likewise instead of using for each of the shafts two pulleys respectively driven through the intermediary of crossed and straight belts by a motor having a constant direction of rotation, it would be possible to use a single pulley driven through the intermediary of a straight belt by a motor having two directions of rotation, the circuits of which would be controlled by switches of the type of those actuated by the handle 96 in such a manner that the motor or motors thus supplied tend to rotate the threaded shaft or shafts in the same direction as the cursor 71 tends to rotate same when it is displaced by the operator by means of the handle 96.

The handle 96 for operating the cursor 71 may, furthermore, be provided with a general switch for the current supplying the device, said switch being normally open and adapted to be closed by the user when he grips the handle 96 for displacing the cursor 71.

In Fig. 8, an embodiment has been shown of one of the perforating devices actuated by the electromagnets the energization of which is controlled by the selecting devices. It will in fact be understood that it is impossible for reasons of bulk to arrange the electromagnets side by side in such a manner that they actuate directly the members for perforating the band, since such an arrangement would necessitate a width of band incompatible with the possibilities of industrial construction.

In order to eliminate this drawback, the perforating devices are formed by a number of punches 101 which are aligned at suitable intervals and guided in a fixed part 102 placed below a die 103 over the upper face of which passes the band to be perforated 104. Opposite the upper end of the punches 101 a suitably guided cross-piece 105 moves with a reciprocating movement. Opposite the lower face of the cross-piece 105 are arranged parts 106 which are respectively in contact with the punches 101 but which do not normally come into contact with the lower operative face 109 of the cross-piece 105. Each of said parts 106 is provided at its front part with a heel 108 of such height that when by displacing the part 108 said heel is brought opposite the operative face 109 of the cross-piece 105, it is moved downwards by said cross-piece thereby causing the corresponding punch 101 to be depressed and consequently the band 104 to be perforated. The part 106 is normally urged towards the left by a spring 110, one of the ends of which is fixed on a fixed part, whereas the other bears on the rear end of said part 106. The rear end of the part 106 is connected, by any suitable means, to the armature of the corresponding electromagnet in such a manner that when said electromagnet is energized under the control of the selecting device, the part 106 is pulled towards the right and brings the heel 108 opposite the operative face 109 of the cross-piece 105 so that when said cross-piece 105 is subsequently lowered, the corresponding punch 101 is depressed and perforates the band 104.

Fig. 9 shows diagrammatically another embodiment of the translating mechanism which has the advantage of eliminating, for one of the coordinates, any conversion of rectilinear movement into circular movement, thereby considerably reducing friction. In this embodiment, instead of being plane, the board 1 is cylindrical and is formed by a drum 112 at the periphery of which the drawing is fixed. In order to retain the visibility of said drawing, the same is preferably wound only on a half-circumference of the drum 112. Said drum 112 is journalled by means of a shaft 113 in fixed brackets 114 and 115. One of the ends of the shaft 113 carries a handwheel 116 or other operating device, whereas the other end is connected to one of the selecting devices.

Opposite the drum and on a fixed frame 118 is adapted to move a suitable cursor 117, the rectilinear movements of which are converted, by any suitable means, into an angular movement which controls the movement of the other selecting device. Thus for example the cursor 117 may be connected to the two ends of a chain 119 or the like passing over pinions 120 and 121, one of said pinions being connected to the actuating mechanism of said selecting device.

In another embodiment, the drum 112 could be fixed. In this case, the frame 118 serving as a guide for the cursor 117 would pivot about the spindle of the drum 112 and the angular displacements of said frame 118 would in this case be transmitted, by any appropriate means, to one of the selecting devices, the other selecting device continuing to be actuated, by any suitable means, by the movements of the cursor 117 along the generatrices of the cylinder 112.

Finally the pivoting of both the drum 112 and of the frame 118 could be permitted as shown in Fig. 10. In this embodiment, the drum 112 is journalled by its shaft 113 in the fixed brackets 114 and 115. One of the ends of the shaft 113 carries a hand-wheel 116 or other operating device, whereas the other end of the shaft 113 is secured to a bevel gear 122. The frame 118, on which the cursor 117 moves in an identical manner with that described with reference to Fig. 9, is journalled at its end on the shaft 113 and is secured to a bevel gear 123 which is identical with the gear 122 and is located opposite the latter. A bevel planet pinion 124 meshes with the gears 122 and 123 and is journalled on an axle 125 mounted on an arm 126 which is itself journalled on the shaft 113. The axle 125 drives one of the selecting devices and it will be readily understood that by means of such an arrangement, the angular movements of the axle 125 about the shaft 113 will be at each instant the resultant of the angular movements of the drum 112 and of the frame 118. The other selecting device will be actuated, as in the case of Fig. 9, by the rectilinear movements of the cursor 117.

Figs. 11 and 12 show a device for selecting by panels. For this purpose, a panel 130 similar to the board 1 contains all the elements (21,000 in the example considered), a second panel 131 contains elements representing the zones (210 in the example considered), whereas a third panel 132 contains elements representing the sectors (6 in the example considered). In the panel 130, the elements of corresponding order, in each of the zones such as defined on the panel 131, are grouped, whereas in the panel 131 the elements of corresponding order, in each of the sectors such as defined on the panel 132, are likewise grouped.

Opposite each of the panels 130, 131 and 132 and in such a manner as to be in contact with the elements of said panels, are located brushes 134, 135 and 136 respectively. Said brushes are provided at the end of arms 137 and 138 which are secured together. Furthermore, a panel 133 is provided in front of the panels 130 to 132 and receives the drawing or the like that it is desired to reproduce. An arm 139, which is identical with the arms 137 and 138 and is provided with a handle 140 enables said drawing to be followed by means of a point or the like 141 located opposite the brushes 134 to 136. The arms 137, 138 and 139 are secured to each other by their end opposite that carrying the brushes and the whole arrangement is journalled on a shaft 142 which is fixed by its ends on one of the sides of a rigid frame 143 the opposite side of which is journalled on a fixed shaft 144 which is supported by a fixed part 145. It will be seen that when the operator follows, by means of the point 141, the drawing which is applied on the panel 133, the brushes 134, 135 and 136 move in a corresponding manner on the panels 130, 131 and 132 on which are arranged the contact studs representing respectively the elements, the zones and the sectors. Said studs, which are suitably grouped are connected to the various electromagnets in a similar manner to that indicated with reference to Fig. 1 for the contacts of the various banks of the selecting devices.

In order partly to avoid multiplying the studs, a plurality of brushes may be arranged on each of the arms, each of said brushes corresponding to a certain part of the boards. Thus it would be possible to have one brush per sector, which would require six brushes per arm in the example under consideration.

The embodiment of Figs. 13 to 17 is mainly characterized by the combination of the following features:

(1) The board or other device which forms the first element of the previously described combination carries fixed contacts which are equal in number to that of the zones, and are arranged in the same manner as the zone of the publicity panel;

(2) Said board furthermore carries contact frames representing the sectors and limiting same;

(3) A carriage provided with a contact is adapted to move in all directions on the board, and thus successively touch in any order the zone and sector contacts which are suitably connected to the corresponding marking devices; said carriage has the shape of a zone and is provided with contacts which are equal in number to the elements of a zone and similarly arranged, and are connected by a flexible cable, or in any other suitable manner, to the corresponding marking devices.

Functionally, the selection is effected by moving the carriage over the board, and by the movement, over the fixed contacts of the carriage, of a movable contact 209 (Fig. 16) carried like a pencil by the operator.

In Figs. 13 to 16, use is made, as previously in Figs. 11 and 12, of the panel 131, representing the zones, but said panel is constructed in a somewhat different manner so that it may at the same time serve (instead of a special panel 132) as a support for the sector contacts. Furthermore, the panel 130 of Figs. 11 and 12 which previously contained 21,000 contacts suitably grouped on 100 wires is in this case replaced by a much smaller panel 159 (Figs. 15 and 16), since it only corresponds to one zone and therefore only carries 100 contacts; this little panel is movable, as will be explained hereinafter, in such a manner that it can come into register with any one of the 210 zones of the panel 131.

The panel 131 is divided into zones by a metal chequering, all the elements of which are designated by the same reference numeral 150, said elements serving as contacts characterizing the crossing of a zone for passing into a following zone. Furthermore, inside each zone is arranged another contact; all of said zone contacts have been designated by the same reference numeral 151.

The metal chequering 150 is interrupted, as seen in Fig. 13, at the limits of each zone; said limits are materialized by metal bands 152 which surround the zones, and which form contacts that are intended to characterize the passing from one sector into another, as will be explained hereinafter. Finally, in this embodiment, use is made of a last chequering shown at 153 the elements of which are arranged between the metal bands 152. Said chequering 153, which is not absolutely necessary, is intended to serve as contacts for signalling the passage from one sector into another.

A rule 154 is movable relatively to the panel 131 parallel with its vertical sides. The method of guiding said rule 154 may be one of those usually employed in certain drawing tables wherein there also exists a rule which is movable over the table, the direction of movement being parallel with the vertical sides of the table, whereas the rule is compelled to remain parallel with the horizontal sides of the table; such a guiding device is not part of the invention. In the example shown, the rule 154 is provided at each end with rollers 155 which are arranged on either side of the panel 131 and which preferably roll inside guide rails of U-shaped cross-section. The ends of the rule 154 are respectively fixed to two endless belts 156 which are supported at the top and at the bottom by pulleys 157 mounted on upper and lower parallel shafts 158.

A carriage 159 is movable on the rule 154 parallel with the horizontal edges of the panel 131. The method of guiding said carriage may be also, of course, be of any kind and is not part of the invention. In the example shown, the carriage 159 is mounted on slide-ways 160 and, for controlling its movement, use is made of a handle 161 mounted on another slideway 162 parallel with the two former ones. The handle 161 is connected to the carriage 159 by belts 163 and 164 which are fixed respectively at their ends on the handle 161 and on the carriage 159; said belts are guided on return pulleys which are all designated by the same reference numeral 165 and are arranged at the ends of the rule 154. The shafts of said pulleys are horizontal, as seen in Fig. 14; but in order to enable their operation to be better understood, they have been shown with their shafts vertical in Fig. 15.

It will thus be seen that, when the handle 161 is pushed towards the right, for example, the belt 163 is pulled and owing to the operation of the return pulleys, this pulling has the effect of forcing the carriage 159 to move in the same manner towards the right. The movement is permitted without difficulty owing to the fact that the belt 164, which does not serve to pull in the movement towards the right as will be readily understood, does not offer any resistance to said movement.

The carriage 159 forms a small panel of the size of a zone, as can be clearly seen in Fig. 15, and it carries as many contacts as there are elements in a zone, that is to say 100 in the example chosen. Each of said contacts is connected to one of the conductors of a flexible cable 165' which can follow all the displacements of the carriage 159 and of the rule 154. Apart from the 100 aforesaid conductors, the flexible cable 165' is provided with another 165ª which is connected to a brush 166 which is resiliently mounted as seen in Fig. 16 and is adapted to touch, during the displacements of the carriage 159 and of the rule 154, the fixed contacts carried by the panel 131, that is to say the zone contacts 151, the chequering 151, the metal bands 152 and the chequering 153.

As regards the electric wiring, the device is constructed as follows:

Each of the conductors of the flexible cable 165, save of course the wire 165a, is connected to one of the perforating or marking devices of the machine, as the conductors 33—35—36 of Fig. 1.

The zone contacts 151 are grouped together sector by sector, according to their place in said sectors, in such a manner that, for the 210 zones distributed in 6 sectors in the example considered, there are 35 zone conductors issuing from the panel 131. Said zone conductors are the equivalents of the previous wires 52—53 and they are connected to the zone perforating or marking devices 46—47 shown in Fig. 1.

The metal bands 152 are respectively connected to switching devices for the sector marking devices shown at 55—56, as will be described hereinafter. Finally, the chequering 151 is connected by a conductor to the winding of the aforementioned relay 62 of Figs. 1 and 17. It will be added that the relay 64 and its contacts 65 and 41 are eliminated in this embodiment.

The chequering 153 is connected by a conductor not shown to a signalling device, preferably a sound signalling device, 210, which warns the operator when he passes from one sector to another while he is drawing.

The operation of the embodiment which has just been described is as follows:

The operator follows the drawing which serves him as a working plan by means of a metal point 209 (Fig. 16) connected, like the previous conductor 40, to one of the terminals of the source of current 39, but taking care that the panel formed by the carriage 159 is placed underneath the part of the drawing he is following, and at the same time exactly on top of a zone of the panel 131. In other words, the operator begins by choosing the zone in which he intends to begin his work; he brings the carriage 159 exactly above said zone; then he closes a switch placed on the conducting wire which connects his pointer to the source of current, and he is thus ready to start work.

The operator first of all brings a general switch 167 (Fig. 17) into the closed position, then he determines in which sector he is and he depresses the corresponding contact of a series of switches 168 which are equal in number to that of the sectors. This operation has the effect, as will be explained hereinafter, of causing one of the sector perforating devices 55—56 (Fig. 1) to be energized. Furthermore, as soon as the current has been caused to flow by the general switch 167, one of the zone perforators 46—47 has been energized by the brush 166 touching one of the zone contacts 150 corresponding to the zone covered by the carriage 159.

The operator then starts his drawing by perforating the paper with his point, taking care that the perforations are effected above the contacts carried by the carriage 159. In this manner, at each perforation, the point touches one of said contacts and closes the circuit of one of the element perforators or markers, of the series 31—32 shown in Fig. 1.

When the drawing is terminated in one zone and it is necessary to pass into the adjacent zone, the operator moves the carriage towards said adjacent zone. The brush 166 leaves the zone contact it was touching hitherto, so that the corresponding perforator, in the series 46—47, is no longer energized. Then the brush 166 touches the chequering 151 which has the effect of energizing the relay 62 which, at the contact 38 breaks all the perforator circuits and, at the contact 63, closes the circuit of the electromagnet 61 which energizes and feeds the strip of paper to be perforated, as previously explained. Finally, when the brush 166 touches the contact 150 of the fresh zone, it again energizes one of the perforators of the series 46—47 and the operation starts again as already described.

In order to explain what occurs when one of the sectors is left, to pass into an adjacent sector, reference will be had to Fig. 17.

When at the beginning the operator depressed one of the contacts 168, he closed the circuit of an electromagnet 169 actuating the contacts 170, 171 which are not subjected to the action of retracting springs, and which can only be returned to their initial position when another winding 172 is energized. Consequently, the contacts come into their left hand position and remain there until the winding 172 is energized. The contact 170 closes the circuit of one of the perforators of the series 55—56.

When the brush touches the conducting band 152 corresponding to the sector under consideration, the electromagnet 172 is energized and returns the contacts 170—171 to their right hand position, so that the perforator which was energized becomes de-energized by its circuit being broken at 170. It will be noted that, when passing from one zone to another, said circuit was broken at the contact 38, but that it was immediately closed again when the electromagnet 62 was no longer energized. Now, the circuit of the perforator is finally closed until the relay 169 is energized again.

When the brush 166 touches the adjacent conducting band 152, the electromagnet 169 corresponding to this fresh sector is energized, since the contacts 170—171 are in their right hand position. The perforator is energized at the contact 170, and so forth.

When the operation is completely finished, the main switch 167 is returned to its inoperative position. During this movement, the switch 167, which is provided with a number of brushes equal to that of the sectors, that is to say 6 in the example under consideration, touches the 6 contacts 173, which are respectively connected to the relays 172. Said relays are energized, without any effect in the event of the contacts 170—171 being in their right hand position; but for one of them the contacts in question had remained in their left hand position, so that said contacts are returned to their right hand position which is their inoperative position.

Apart from the sound signalling device for the passing from one sector to the other, a luminous signalling board may be provided for the sector and the zone in which the operation is being effected. The circuit of each signalling lamp is controlled by a contact which is closed while the corresponding perforator is energized. Signalling lamps may also be provided for the elements themselves; in this case, each lamp is controlled by a relay with a maintenance circuit. The relay is energized at the same time as the corresponding perforator and its maintenance circuit is opened by the energization of the relay 62. It is thus possible to ascertain at every instant in which sector the work is being effected, in which zone, and what drawing has already been effected in such zone. The perforation of the paper gives a further checking means.

The embodiment of Fig. 18 and the following figures is characterized by the fact that the board or the like carries laterally three series of contacts corresponding respectively to elements, zones and sectors successively encountered along this edge of the board, whereas a movable rule, perpendicular to said edge, also carries three series of contacts and a carriage which is movable along said rule, contacts co-operating with the former ones being carried, on the one hand by the movable rule (to rub against those of the board) and on the other hand by the carriage (to rub against those of the movable rule).

In this embodiment, there is a board 1 similar to that of Fig. 1; on the left hand vertical edge are arranged three series of contacts. A first series, comprising insulated contacts 175 forming a line parallel with the edge of the board, includes 150 contacts since in the example chosen there are in the vertical direction 3 sectors of 5 zones of 10 contacts. Said 150 contacts are distributed in groups of 10, that is to say that the homologous contacts of each group are grouped together on 10 conductors which correspond to the conductors 34. A second series of contacts is shown at 176; it is composed of metal bands each extending parallel with the contacts 175 and corresponding to 10 of said contacts, that is to say to a zone. There therefore exist 15 bands 176 distributed in three groups of 5, that is to say that the homologous bands of each group are grouped on 5 conductors which correspond to the conductors 54. Finally, a third series of contacts is formed by bands 177 which are arranged parallel with the former contacts 176 and each correspond to 5 of the bands 176, that is to say to a sector. Said bands 177 are electrically connected to the perforators 55—56 like the contact bands of the switch 58.

A rule 178 is movable over the board 1 while remaining parallel with itself, as in the previous example. In this embodiment, said rule is balanced by counterweights 179, through the intermediary of an endless cable 180 passing over guide pulleys 181. Said rule carries brushes 182, 183, 184 each cooperating with one of the three series of previously described contacts carried by the board 1. Furthermore, the rule 178 itself carries three series of contacts. One of said series is formed by insulated contacts 185 which are 140 in number, since in this example there are horizontally two sectors of seven zones of ten elements each. The second series is formed by fourteen bands 186 of zone contacts each extending over seven zone contact bands. The contacts 185 are distributed in groups of 10, the homologous contacts of each group being grouped on ten conductors; the bands 186 are distributed in two groups of 7, the contacts of each group being grouped on seven conductors; finally, each contact band 187 is connected to a special conductor.

Each wire corresponding to the contacts 185 leads to a relay, the energization of which closes ten contacts to which are respectively connected the wires 33, 35, 36. Each wire corresponding to the contact bands 186 leads to a relay, the energization of which closes five contacts to which are respectively connected the wires such as 52. Finally, each wire corresponding to the contact bands 187 leads to a relay, the energization of which closes three contacts to which are respectively connected the wires such as 53.

On the rule 178 is adapted to move a carriage 188 which carries brushes 189, 190 and 191 each co-operating with a series of previously described contacts. The movement of said carriage on the rule can be effected in any suitable manner, and for example directly by hand, or again through the instrumentality of a screw 192 for which the carriage 188 forms the nut and which is operated by means of hand-wheels or of cranks 193. The members may even be so arranged that the carriage 188 can be actuated at will either directly by hand or by means of the screw. For this purpose, the carriage 188 is provided with a movable comb 194 which is normally brought into mesh with the screw 192 under the action of a spring 195, but which can be released by a manual pressure in the direction of the arrow, on a lever 196 secured to the comb 194. This latter, which is pivoted at 197, then becomes disengaged from the screw 192 and the carriage can be moved quickly by hand. When the lever 196 is released, the spring 195 returns the comb into mesh with the screw.

By way of example, for guiding the carriage 188 on the rule 178 V-shaped slide-ways have been shown for the corresponding projections of the table of the carriage, and raceways 199 which are likewise V-shaped, for correspondingly shaped rollers 200 rotating on pins 201 secured to the carriage. The rule itself is guided on the board by horizontal rollers 202 and vertical rollers 203. Finally, the rule could be moved vertically by similar means to those which were described for the displacement of the carriage on the rule.

The operation is obviously identical with that previously described so that it would be superfluous to repeat it for this embodiment which is advantageous owing to the very small friction it creates, thereby considerably facilitating the operation of the apparatus.

What we claim as our invention and desire to secure by Letters Patent is:

1. In a machine for manufacturing controlling bands having a plurality of series of controlling marks, marking means grouped in series which are equal in number to the number of series of controlling marks, selecting means associated with each series of marking means, for selecting one of said means in each series and causing same to be actuated, figurative means representing for an operator the whole of the elements to be controlled by the controlling band, and means for actuating the selecting means by said figurative means.

2. In a machine for manufacturing controlling bands having a plurality of series of controlling marks, marking means grouped in series which are equal in number to the number of series of controlling marks, selecting means associated with each series of marking means, for selecting one of said means in each series and causing same to be actuated, figurative means representing for an operator the whole of the elements to be controlled by the controlling band, means movable relatively to said figurative means, for enabling the operator to perform drawing movements, and means for actuating said selecting means by said movable means.

3. In a machine for manufacturing controlling bands having a plurality of series of controlling marks, marking means grouped in series which are equal in number to the number of series of controlling marks, selecting means associated with each series of marking means, for selecting one of said means in each series and causing same to be actuated, figurative means representing for an operator the whole of the elements to be controlled by the controlling band, other figurative means which are movable relatively to the first, for representing a group of elements to be controlled by one of the series of controlling marks of the controlling band, movable means for enabling the operator to perform drawing movements, means for actuating certain of the selecting means by the relative movement of the figurative means, and means for actuating other selecting means by the movement of the movable drawing means.

4. In a machine for manufacturing controlling bands having a plurality of series of controlling marks, marking means grouped in series which are equal in number to the number of series of controlling marks, selecting means associated with each series of marking means, for selecting one of said means in each series and causing same to be actuated, a figurative surface representing for an operator the whole of the elements to be controlled by the controlling band, means movable relatively to said figurative surface, for enabling the operator to perform drawing movements, and means responsive to the coordinates of the movements of said means movable relatively to said surface, for actuating said selecting means.

ARMAND ZUCKERMANN, CALLED
ARMAND ZOUCKERMANN.
ADOLPHE JULIEN EMILE RENARD.